2,908,101

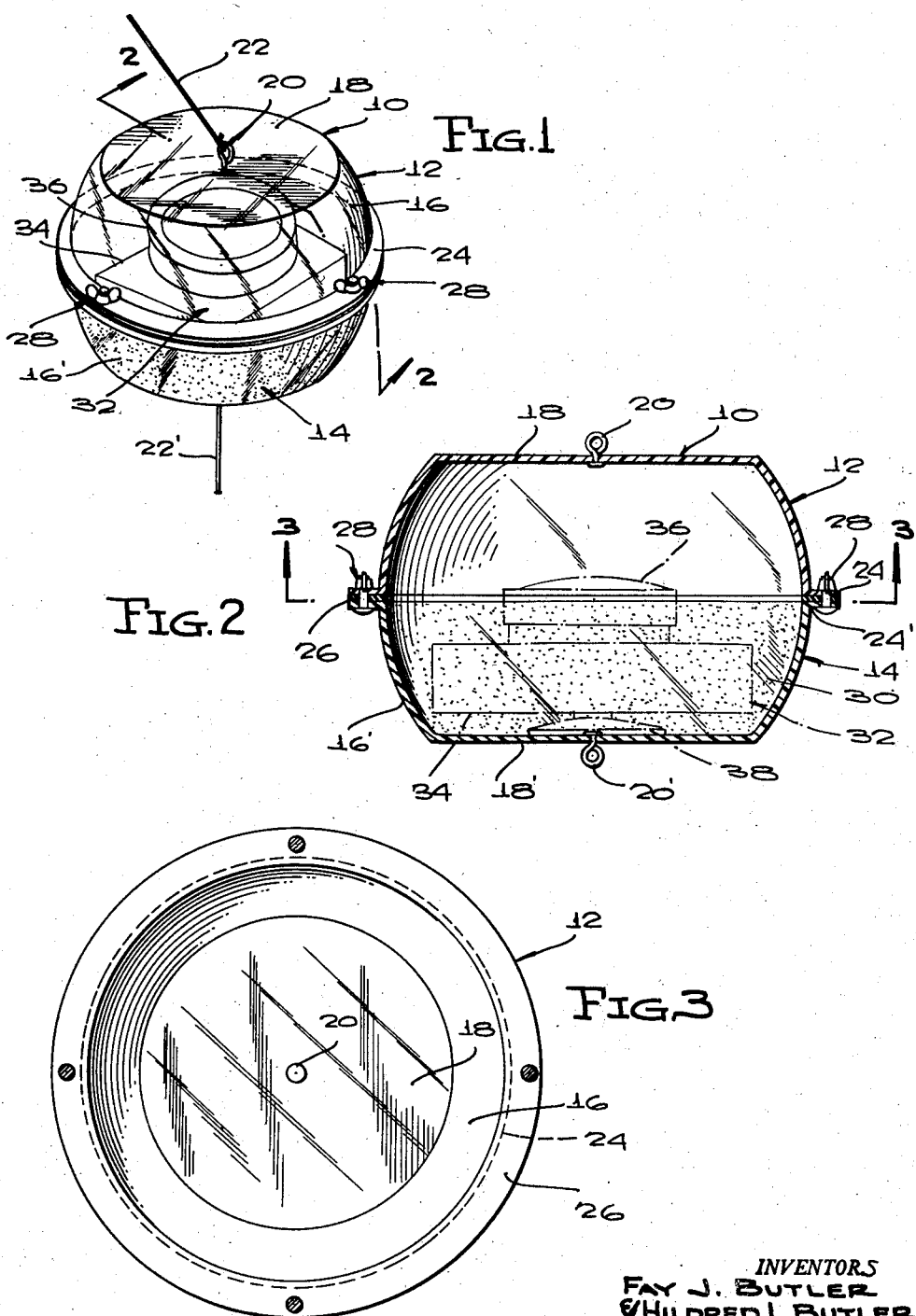

ILLUMINATED FISHING FLOAT

Fay J. Butler and Hildred L. Butler, Winter Haven, Fla.

Application October 19, 1956, Serial No. 617,178

1 Claim. (Cl. 43—17.5)

This invention relates to an improved illuminated fishing float which is usable also as a distress signal or position marker.

The primary object of the invention is to provide a practical and efficient device of this kind which is relatively broad and flat, so as to have good stability in water, and which contains a light source which projects light rays principally through one side of the device, the device being adapted to be floated in the water with the light projected downwardly to attract fish in the water to the vicinity of the device, or reversed and floated in the water so that the device projects light upwardly and serves as a distress signal or position marker. The device having means for attaching thereto a fishing line or an anchor line, depending upon the use of the device.

Another object of the invention is to provide a float of the character indicated, which can be made in attractive, rugged, and serviceable forms at relatively low cost, is easily used, and is highly satisfactory for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a perspective view of a float of the invention;

Figure 2 is an enlarged vertical transverse sectional view taken substantially on the plane of line 2—2 of Figure 1; and Figure 3 is a further enlarged horizontal sectional view taken substantially on the plane of line 3—3 of Figure 2.

Referring to the drawings in detail, the illustrated float, indicated generally at 10, is of a vertically fore-shortened or flat barrel shape, and comprises upper and lower sections on shells, indicated generally at 12 and 14, respectively. The shells 12 and 14 may be of any suitable material, such as plastic.

The shells 12 and 14 are the same in size and shape. The upper shell 12 has a downwardly and outwardly curved side wall 16 depending from a flat top wall 18, having centrally secured therein an upstanding eye 20 to which a fishing line 22 may be readily secured. On the free edge of the side wall 16 is a lateral annular flange 24.

The lower shell 14 has an upwardly and outwardly curved side wall 16' and a flat bottom wall 18' which has centrally secured therein a depending eye 20', to which can be secured one end of a depending fishing or anchor line 22'. On the free edge of the side wall 16' is an annular flange 24'. The open sides of the shells 12 and 14 are registered, and interposed between the flanges 24 and 24' is a sealing gasket 26, and the flanges 24 and 24' and the gasket 26 are transversed by suitable fasteners, such as wing-bolt assemblies, indicated generally at 28. The float is thereby sealed against entry of water therein.

The upper shell 12 is transparent, and the lower shell 14 has on its inner side a highly reflective surface 30 of any suitable character.

Mounted within the lower shell 14, and indicated generally at 32, is a self-contained light source, incorporating a case 34, and an upwardly directed lens assembly 36. Suitably secured to the underside of the case 34 is a detachable securing means, such as a suction cup 38, which is secured to the bottom wall 18' of the shell 14. The light directed upwardly by the lens assembly 36 passes through the wall of the upper shell 12, and the reflective inner surface 30 of the lower shell 14 increases the amount of light passing through the upper shell 12.

When the float 10 is used in the position shown in Figure 1, the flexible line 22' is to have secured thereto a suitable sinker or anchor (not shown), which causes the float 10 to submerge a predetermined distance below the surface of a body of water. The line 22 is preferably a fishing line, serving as a retaining line for retrieving the float. With the float 10 floating on the surface of a body of water, and an anchor secured to the line 22', the float 10 can be used as a distress signal or position marker. The float is stabilized in the water to mark a location and the light rays emitted from the light source 32 are visible to searchers by air or by boat. With the float inverted and the upper shell 12 downward, the light rays are directed downwardly in the water, so as to attract fish to the vicinity of the float.

The foregoing is considered as illustrative only of the principles of the invention. Since numerous modifications and changes will readily occur to those skilled in the art, it is not desired to limit the invention to the exact construction shown and described, and accordingly all suitable modifications and equivalents may be resorted to, as fall within the scope of the appended claim.

What is claimed is:

A fishing float comprising a barrel shaped hollow body composed of substantially similar upper and lower sections, the upper section having a top wall and the lower section having a bottom wall, the upper section being transparent, a light source secured on the bottom wall of and located within said lower section for transmitting light into the upper section, and central fishing line securing means on said top and bottom walls, said lower section having a light-reflecting inner surface for reflecting light from said source into the upper section, and said upper section being devoid of a light-reflecting surface.

References Cited in the file of this patent

UNITED STATES PATENTS

| 231,912 | Irgens | Sept. 7, 1880 |
| 1,338,528 | Reinewald | Apr. 27, 1920 |
| 2,190,791 | Larson | Feb. 20, 1940 |
| 2,272,802 | High et al. | Feb. 10, 1942 |
| 2,599,035 | Wing | June 3, 1952 |
| 2,645,052 | Schiller | July 14, 1953 |
| 2,738,609 | Reed | Mar. 20, 1956 |
| 2,798,330 | Carraway et al. | July 9, 1957 |